Sept. 15, 1942.  J. G. HEASLET  2,295,531

IDLER WHEEL FOR CRAWLER TRACTORS

Filed April 5, 1940

INVENTOR
JAMES G. HEASLET
BY George Douglas Jones
ATTORNEY

Patented Sept. 15, 1942

2,295,531

UNITED STATES PATENT OFFICE 2,295,531

IDLER WHEEL FOR CRAWLER TRACTORS

James G. Heaslet, Hudson, Ohio, assignor to The Cleveland Tractor Company, Cleveland, Ohio Application April 5, 1940, Serial No. 328,141

2 Claims. (Cl. 74—230.8)

This invention relates to idler wheels and, more particularly, to front idler wheels for use in supporting the endless track chains of the type applied to crawler tractors.

Customarily, crawler tractors are provided with power driven chains on either side of the tractor frame, made up of a plurality of pivotally linked shoes suspended over a rear drive sprocket and supported at the front portion of the tractor over idler wheels. The weight of the machine is carried on the lower run of the chains as they pass under rollers carried by pivoted side frames.

Primarily, the present invention consists in a novel front idler wheel construction that is fabricated from a small number of easily formed metal parts. The structure of the idler insures that the chains have full support in passing over them and are prevented from disengagement therewith by the formation of the wheel discs.

One object of the invention is the production of such wheels in such a manner that they possess great strength and rigidity without excessive weight and can be manufactured without mechanical difficulties and at small cost.

Another object is to provide means inherent in the structure of the wheel to prevent mud and stones from lodging in the wheel and binding the chains.

A still further object of this invention is the formation of laterally extending flanges or continuous annular platforms on the outer faces of the idler wheel discs to support and center the shoes of the crawler chain, as they pass around the peripheries of the discs and prevent side movement of the track shoes.

Figure 1:
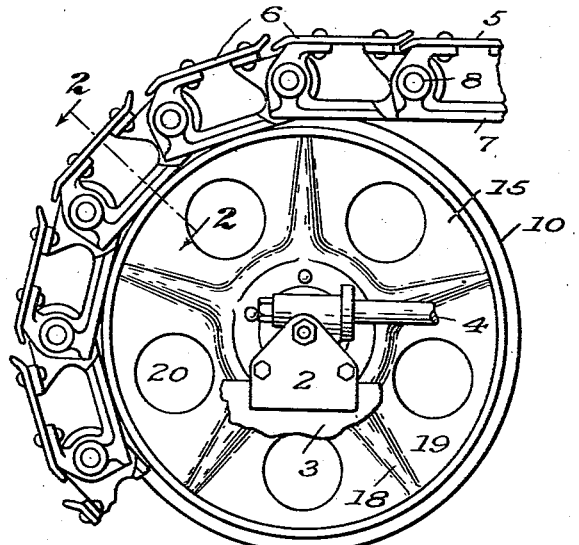
Fig. 1 is a side view of the idler wheel, showing a portion of the shoe chain passing thereover.

Referring to Fig. 1 of the drawings, there is here disclosed a side elevational view of the front idler wheel 10 supported for rotation on an axle carried in bearing 2 mounted on the forward portion of a tractor side frame 3, shown in fragmentary form. Numeral 4 denotes a portion of a conventional thrust mechanism for maintaining the front idler wheel in proper contact with the crawler chain 5 that is composed of an endless series of pivoted shoes 6 and, thus, the thrust mechanism 4 compensates for any looseness or wear in the chain. Each track shoe 6 comprises spaced parallel side rails 7, which are joined at their ends to adjacent shoes by pins 8 and with ground engaging plates 9 riveted or welded to the outer surfaces of the side rails.

The construction of the improved idler wheel 10 includes a wrought or forged hub member 11, having a transverse bore 12 therethrough for mounting on the axle carried by bearing 2 and side frame 3. A central outwardly extending peripheral flange 13 is integrally formed on the hub for supporting and spacing the wheel discs 15. Each of these wheel discs 15 is dished in such a manner that their inner portions closely embrace the sides of the hub flange 13 with the inner peripheries of the apertures 16 abutting the shoulders 17 thereof and is secured thereto by rivets or welding. Equi-distant radially extending spoke-like corrugations 18 are pressed outwardly from the planes of the discs with the intermediate sections 19 between the corrugations pressed inwardly and apertured with registering openings 20.

Figure 2:
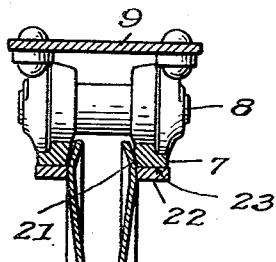
Fig. 2 is a partial transverse section taken on line 2—2 of Fig. 1.
Figure 5:
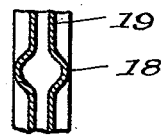
Fig. 5 is a sectional view on line 5—5 of Fig. 4.
Figure 3:
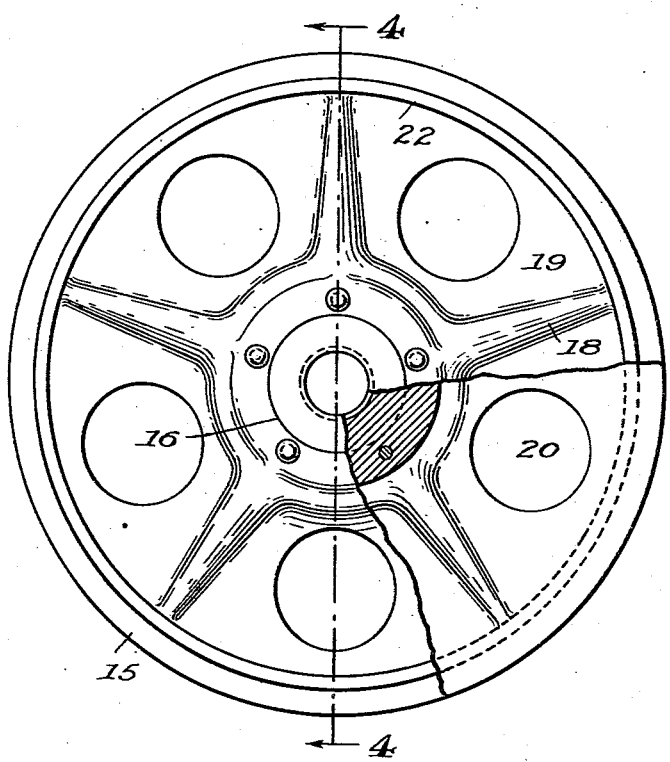
Fig. 3 is a front plan of the idler, with a portion thereof in section.
Figure 4:
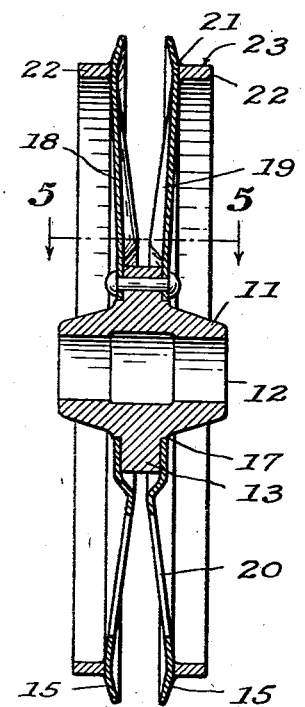
Fig. 4 is a vertical cross-section taken on line 4—4 of Fig. 3.

The discs are slightly flared toward their outer peripheries and thereafter tapered inwardly at 21 and adjacent this change of angle point, each disc has a comparatively heavy laterally extending ring 22 welded thereto. Referring to Fig. 2, it will be seen that the outer edges of the discs closely fit the inner sides of the rails 7 of the shoes 5, while the outer faces 23 of the rings 22 form continuous platforms for supporting the shoe chain during its movement. This view also discloses the snug fit between the inner edges of the shoe rails 7 and the inwardly tapered peripheral portions of the wheel discs, which insures proper centering of the shoes while passing around the idlers and prevents stones and mud from jamming the chain. Furthermore, the continuous flanges 22 amply support the shoe rails during their travel and permit flexing of the pivoted shoe tracks.

What I claim is:

1. An idler wheel for carrying the endless track chains of crawler type tractors comprising a hub member having an annular flange thereon, a pair of wheel discs secured to the opposite faces of said flange, the said wheel discs having the portions thereof adjacent their outer peripheries flared inwardly toward one another and a laterally extending rigid ring secured to the outer peripheries of each of said discs adjacent the point of inward flare.

2. An idler wheel as set forth in claim 1, wherein the wheel discs are outwardly flared from adjacent their inner peripheries and inwardly flared adjacent their outer peripheries with the said lateral rings welded to the outer faces of the wheel discs at the point of juncture of the oppositely flared portions.

JAMES G. HEASLET.